(No Model.) 2 Sheets—Sheet 2.
C. L. SCHOENSTEDT.
CULTIVATOR.
No. 301,011. Patented June 24, 1884.
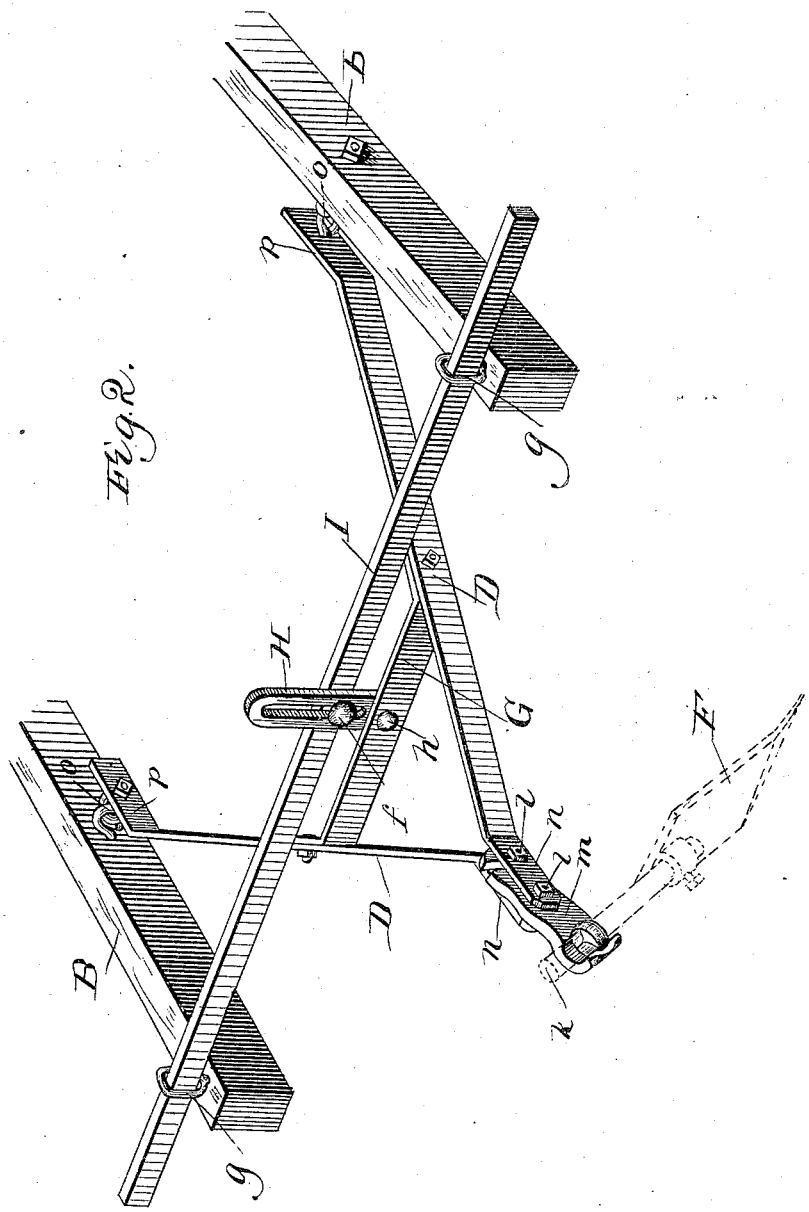
Witnesses:
Chas. E. Gaylord.
Douglas Dyrenforth
Inventor:
Christopher L. Schoenstedt
by Dyrenforth & Dyrenforth,
Attorneys.

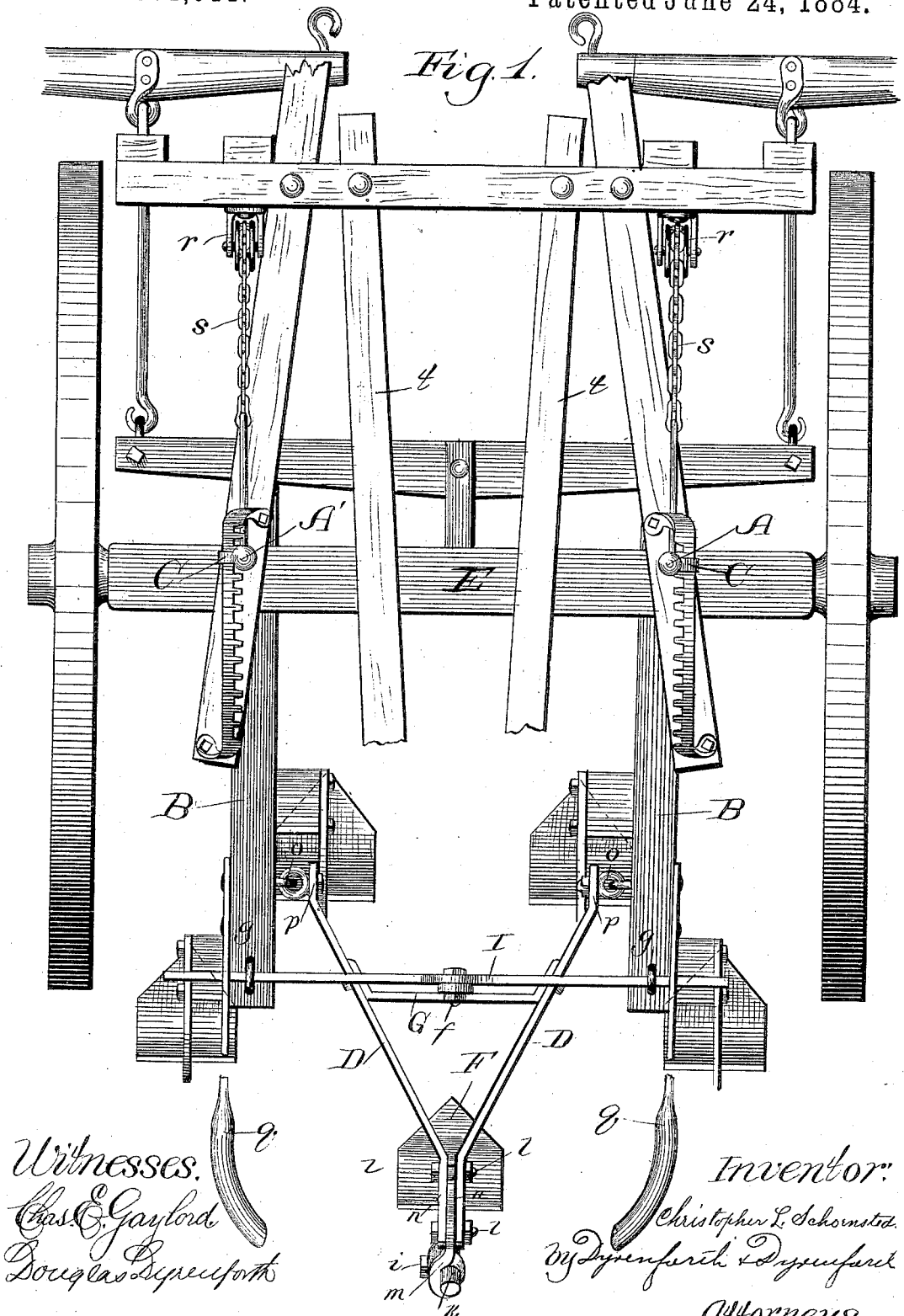

UNITED STATES PATENT OFFICE.

CHRISTOPHER L. SCHOENSTEDT, OF MONEE, ILLINOIS.

CULTIVATOR.

SPECIFICATION forming part of Letters Patent No. 301,011, dated June 24, 1884.

Application filed February 14, 1884. (No model.)

*To all whom it may concern:*

Be it known that I, CHRISTOPHER L. SCHOENSTEDT, a citizen of the United States, residing at Monee, in the county of Will and State of Illinois, have invented certain new and useful Improvements in Cultivators; and I hereby declare the following to be a full, clear, and exact description of the same.

My invention relates to the class of implements used in the art of husbandry for tending growing crops and for breaking the ground preparatory to planting.

The objects of my invention are to provide a central share which shall be adaptable to the various forms of cultivators, having shares affixed to side beams, whereby the shares upon each side beam may be raised and lowered independently of the shares upon the opposite side beam, and whereby the whole machine shall be relieved of the rigidity incident to many cultivators having a central share, thus allowing it to sway to suit any irregularity in the line of draft, and also whereby the resistance shall occur at the forward portion of the machine to pull downward the collar forming a part of the harness of each horse, in order to produce the draft upon the chest of the animal.

To this end my invention consists in a share forming the central share for a cultivator, and capable of adjustment to the same in a manner to extend behind the side shares, whereby it shall not interfere with the independent vertical movements of the side beams.

My invention consists, further, in certain detail details of construction and combinations of parts, and in certain features incident to such construction and combination, all as hereinafter more fully set forth.

In the drawings, Figure 1 is a plan view of a sulky-cultivator, having the seat portion removed to show details, and showing my improvement; and Fig. 2, a perspective view of my improvement attached to the share-carrying side beams of a cultivator.

The machine shown in Fig. 1 of the drawings is of the kind capable of use as a sulky-cultivator when the seat (omitted from the figure to enable the display of more important details) is properly adjusted upon the bearings *t* to accommodate the driver, who is thus placed between the levers A and A', the one at his right, the other at his left hand, each of which levers is connected by a chain, *s*, passing over a pulley, *r*, with a share-carrying beam, B, to permit the raising and lowering of the shares on each side independently of those upon the opposite side. C is a pawl-and-ratchet mechanism, serving to retain a lever at the angle necessary to maintain the shares which it controls at the desired position. Handles *q q* are provided to permit management of the shares by the driver when walking behind the machine.

The foregoing description is confined to the features of one form of cultivator thought to require mention in order to render easily understood my invention, which is adapted thereto, and of which the following is a description.

D is an angular frame, preferably of wrought-iron, formed in two parts or arms, one end of each arm being bent inward to form the part *p*, in a manner to cause it to lie parallel with the share-carrying side beam, when the latter occupies a position at right angles with the axle E, and to which it is secured by means of a link-joint, *o*. The opposite end of each arm of the frame is bent outward to form the part *n*, also in a manner to cause it to lie parallel with the share-carrying side beams when the latter occupy a like position with reference to the axle. The arms of the frame, when brought together, as shown in the drawings, produce the angular shape, and the backward-projecting parts *n*, between which the share-holder *m* is inserted, are held in position by nuts and bolts *l*, which at the same time secure the arms of the frame D together. The holder *m* is provided with an opening toward its rear extremity, which is beveled to an angle to give the desired angle to the share F, which is inserted therein by means of the handle *k*, and adjustably secured in position by means of the set-screw *i*. The holder *m* is slotted toward its forward extremity, as shown, to form a latch upon the forward bolt, *l*, by which construction fracture of the share F may be avoided in case the latter shall encounter an unyielding obstacle, since the holding device will thereby yield and swing downward and backward upon the pivot constituting the rear bolt, *l*, before the strain upon the share can become sufficient to fracture the latter.

G is a brace bolted toward its opposite ends, which are bent to an angle corresponding with the angle of the arms of the frame D, produced by their junction to the inner side of each arm, to strengthen the frame and to afford a means for attaching the slotted upright bar H, which is secured at a central point thereon by means of a bolt, *h*, upon which it has a pivotal movement.

I is a bar resting in bearings *g*—one on each beam B—toward the rear extremity of the same, in which the bar has a horizontal sliding movement. The frame D is secured to the beams B at points to cause the upright bar H to lie against the rear face of the bar I, provided with a set-screw, *f*, which passes through the slot in the upright bar, to permit adjustment of the share F with reference to the depth which it is desired that the same shall enter the soil.

My improvement renders it possible to employ an odd or central share, and, if desired, more than one of the same, without impairing the advantages incident to cultivators having the share-bearing beams loosely attached to the axle, and due to the consequent flexibility of the operative parts.

It is obvious that other means than the one described for applying the central share to a cultivator in a manner not to interfere with the normally present capability of independent movement of the side beams could be devised; but such are intended to be included in my invention, which consists, broadly stated, in providing a central share for use upon cultivators, the application of which shall not render the operative parts rigid, and shall still permit the independent raising and lowering of the side beams with reference to each other, and shall cause the main resistance to occur at the forward part of the machine.

What I claim as new, and desire to secure by Letters Patent, is—

1. A central share for attachment to a cultivator, to extend behind the side shares, in combination with mechanism, substantially as described, for connecting the said share flexibly to the said cultivator, whereby the central and side shares may be raised and lowered together by the simultaneous operation of both levers of the side beams, but whereby the independent vertical movements of the share-carrying side beams shall not be prevented, as set forth.

2. The combination, with the share-carrying side beams of a cultivator, of a central share extending behind the side shares, and mechanism for connecting the said central share flexibly to the said side beams, whereby the central and side shares may be raised and lowered together by the simultaneous operation of both levers of the side beams, but whereby the independent vertical movements of the said side beams shall not be prevented, substantially as described.

3. A central share, F, for attachment to the share-carrying side beams of a cultivator, and to extend behind the side shares, in combination with the frame D, holder *m*, secured to the said frame, and provided with an opening to receive the central share, F, brace G, slotted upright bar H, secured to the said brace, transverse bar I, adjustably secured to the slotted upright bar H, mechanism upon each side beam, B, of the cultivator, to receive the bar I and permit a longitudinal sliding movement of the same, and mechanism for flexibly securing the frame D to the side beams, B, all being constructed and arranged to operate substantially as described.

CHRISTOPHER L. SCHOENSTEDT.

In presence of—
 DOUGLAS DYRENFORTH,
 WM. S. BREWSTER.